United States Patent [19]

Potter

[11] 4,228,987
[45] Oct. 21, 1980

[54] VALVE ARRANGEMENT
[75] Inventor: Michael B. Potter, Winterbourne, England
[73] Assignee: Seetru Limited, Bristol, England
[21] Appl. No.: 963,802
[22] Filed: Nov. 27, 1978
[30] Foreign Application Priority Data
  Dec. 20, 1977 [GB] United Kingdom ............... 53086/77
[51] Int. Cl.³ .............................................. F16K 1/34
[52] U.S. Cl. .................................... 251/210; 251/332
[58] Field of Search ................... 251/332, 210, DIG. 1

[56] References Cited
U.S. PATENT DOCUMENTS

| | | | |
|---|---|---|---|
| 2,910,267 | 10/1959 | Holby | 251/332 |
| 2,927,767 | 3/1960 | Ray | 251/332 X |
| 3,051,196 | 8/1962 | Miller | 251/332 X |

FOREIGN PATENT DOCUMENTS 596796  4/1960  Canada ..................... 251/210

*Primary Examiner*—Arnold Rosenthal
*Attorney, Agent, or Firm*—Shoemaker and Mattare, Ltd.

[57] ABSTRACT

The invention provides a valve having a plunger which is moveable towards and away from an annular seat surrounding an inlet port, the seat has, immediately adjacent and surrounding the port, an upstanding annular rim and, immediately surrounding said rim, a flat annular seating surface. The plunger has a nose constituted in part by a flat annular metal portion adpated to be brought into metal-to-metal contact with the flat annular seating surface on the valve seat. On the nose of the plunger immediately within said flat annular metal portion there is formed a recess in which is housed a sealing ring of elastomeric material. When the flat annular portion of the plunger nose is in metal-to-metal contact with the flat annular seating surface of the valve seat, the raised rim of the valve seat enters or is entered into the mouth of the recess and is pressed into resiliently deforming contact with the part of the elastomeric sealing ring which occupies the recess, thus obtaining sealing obturation of the port.

4 Claims, 3 Drawing Figures

VALVE ARRANGEMENT

This invention relates to a valve having a plunger which is moveable towards and away from an annular seat surrounding an inlet port.

More particularly, the invention relates to valve closure arrangements for use in safety and relief valves. However, the valve closure arrangement provided need not be used exclusively for safety valves but may be adapted also to other fluid valves in which the plunger is brought into engagement with an annular seat to close the valve.

It is known for example, in a closure arrangement for a valve, to employ an elastomeric ring seal, functioning as a so-called hydrostatic seal in which the fluid pressure acting on the seal enhances the sealing pressure exerted by the seal on to the seat. One known type of hydrostatic seal is the 'O' ring in which the sealing pressure set up by the ring is not only increased with increasing fluid pressure, but the ring is in a housing recess on the plunger which on metallic contact between plunger and seat encloses a major part of the ring and prevents any demaging extrusion to take place, even under elevated pressures.

In the application of hydrostatic elastomeric ring seals to safety valves, particular problems arise in two respects:

(1) The sealing ring, or more specifically the sealing rim of an annular seal, which must necessarily contain some bulk of elastomer produces more than line contact with the seat and gives rise in fact to a circular sealing area of relatively significant radial width. This renders the effective sealing area somewhat indeterminate, that is difficult to measure or predict. As a result, the set pressure and functioning of the safety valves can become erratic after some duration of operation time.

(2) The seal itself must operate in a configuration of seat and plunger which has to be carefully shaped to control the lift characteristics of the valve and its functioning in the open position. These seat and plunger configurations can be quite critical, and they are often difficult to reconcile with the requirements to provide suitable space and support for the elastomeric seal in its housing recess on the plunger.

(3) Furthermore, the safe and damage free fitting of a delicate seal in the housing recess of a plunger in a safety valve can present problems. It is difficult to secure the seal in its recess in the manner such as to avoid damage under operating conditions, and also to prevent any fluid leaks past the seal when the valve is closed.

The present invention provides a valve with a valve closure arrangement having a sealing ring carried on a valve closure member or plunger which offers substantial improvements in respect of the problems enumerated above.

Broadly stated the present invention provides that in such a valve having a plunger which is movable towards and away from an annular seat surrounding an inlet port, the seat has, immediately adjacent and surrounding the port, an upstanding annular rim and, immediately surrounding said rim, a flat annular seating surface. The plunger has a nose constituted in part by a flat annular metal portion adapted to be brought into metal-to-metal contact with the flat annular seating surface on the valve seat. On the nose of the plunger immediately within said flat annular metal portion there is formed a recess in which is housed a sealing ring of elastomeric material. When the flat annular portion of the plunger nose is in metal-to-metal contact with the flat annular seating surface of the valve seat, the raised rim of the valve seat enters or is entered into the mouth of the recess and is pressed into resiliently deforming contact with the part of the elastomeric sealing ring which occupies the recess, thus obtaining sealing obturation of the port.

Preferably the plunger nose is of two-part metal construction. It has one centre part which is surrounded by a metal ring, the latter having a part constituting the flat annular portion of the plunger. The two metal parts are shaped to define in the plunger nose the recess with an overhang leading to an open mouth of the recess.

Preferably also the two metal parts are in metal-to-metal contact and the region where they are in such contact constitutes a leakage path leading from the recess and communicating with atmosphere. This leakage path constitutes a bleed for any fluid which may enter behind the elastomeric sealing ring in this recess.

The invention will be described with reference to the accompanying cross-section drawings, in which.

Figure 1:
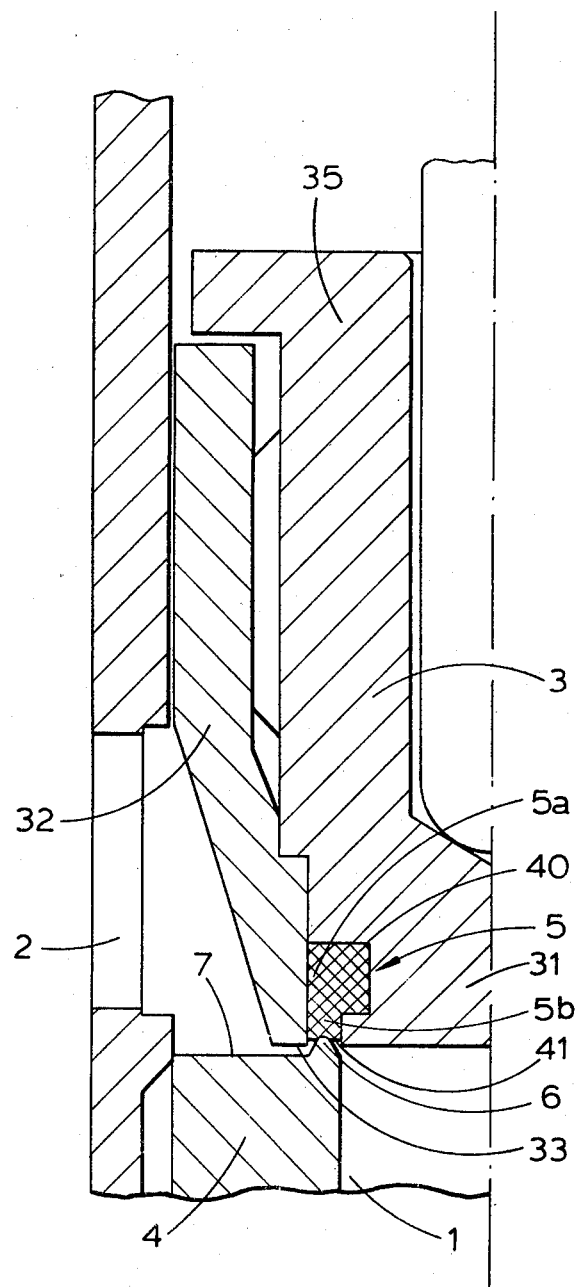
FIG. 1 is a view of relevant parts of a valve closure assembly including a moveable plunger nose and a fixed seat; the parts being shown in FIG. 1 as appearing on the left of a dotted centre line which is the central axis of the assembly.
Figure 2:
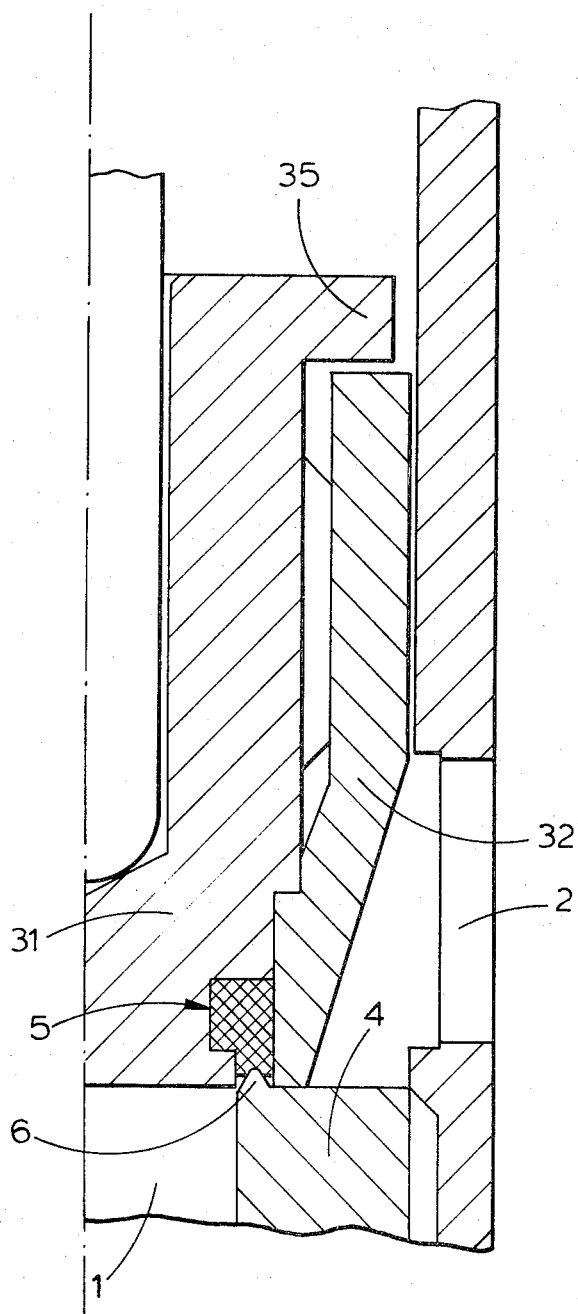
FIG. 2 shows the same parts as they appear on the right of the dotted centre line.

In FIGS. 1 and 2 the valve parts are shown in the partly closed and fully closed conditions respectively.

Figure 3:
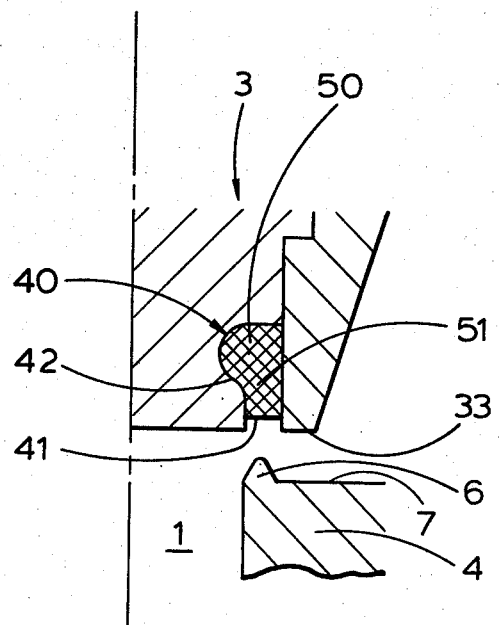

FIG. 3 is a detail view showing a second embodiment of sealing ring housing in a recess of modified shape as compared with the embodiment depicted in FIGS. 1 and 2.

Referring first to FIGS. 1 and 2, there is here shown the relevant parts of a valve closure assembly for controlling flow between an inlet port 1 and outlet or exhaust passages 2.

The inlet port 1 is adapted to be obturated by a plunger, generally designated 3, which is moveable towards and away from a seat, generally designated 4.

Near the nose of a generally cylindrical centre portion 31 of the plunger 3, a recess 40 is formed to accept a sealing ring, generally designated 5. In this embodiment the sealing ring 5 has an L-shaped section consisting of a square body portion 5a from which extends a portion 5b which protrudes and is of approximately half the width of the side of the square body portion 5a. The recess 40 in the centre portion 31 of the plunger 3 accepts the square body portion 5a of the sealing ring 5, but the nose of the plunger centre portion 31 is reduced in diameter and is surrounded by the protruding portion 5b projecting from the body portion of the seal 5. A second part 32 of the plunger is a metal shroud which fits closely over the central metal member of the plunger. The recess 40 in the central metal portion 31 and the shroud 32 are in fact so formed that the sealing ring 5 is trapped in the recess 40, except for the protruding portion 5b of the seal which extends axially into a mouth 41 to make contact with an upstanding ridge 6 on the seat 4, when the plunger 3 comes to lie against the seat 4 to close the valve.

When the plunger 3 is seated, a flat annular axial end face 33 of the solid shroud 32 makes metal-to-metal contact with a flat annular surface 7 of the seat, which surface 7 immediately surrounds the ridge 6. At the same time sealing contact is made by the elastomeric ring 5 with the annular ridge 6 provided upstanding within the flat annular surface 7 of the seat. This upstanding ridge 6 creates the correct conditions for the proper hydrostatic functioning of the seal 5 in that in the closed position of the plunger 3 the sealing ring 5 is supported on all sides by the metal walls defining the mouth of its housing recess and the protruding portion 5b of the seal is so formed that fluid pressure can act on it radially outwards by fluid entering between the seal and the plunger nose.

The nose of the plunger central part 31, and the end face of the solid shroud 32, together with the configuration of the outer face of the solid shroud 32 and indeed the seat itself, outwards of the plane portion 7, which, with its upstanding narrow annular ridge 6, makes contact with the sealing ring 5 and shroud face, can be readily formed into the appropriate configuration to provide the required lift and functional characteristics for the safety valve.

The shroud portion 32 of the plunger 3 may be slipped on to the centre portion 31 from the rear. For this purpose the plunger centre part 31 may be provided with a shoulder 35 against which the shroud 32 may be pushed to located it in the correct axial position relative to the centre part 31.

Turning more particularly to the elastomeric sealing ring 5, the axial contact face of the ring may be formed in a particular way to ensure that the effective sealing diameter of the valve, when closed, is accurately determined. This is preferably done by forming this axial end face slightly concave with a narrow radiused portion at the outer diameter providing the first initial and principal contact area with the rim 6 of the valve seat 4. The body portion 5a of the sealing ring serves both to retain the sealing ring in the housing recess 40 of the plunger and also to provide an effective seal against fluid leakage between the mating metal parts 31 and 32 of the plunger.

Since the valve seat 4 is formed with a narrow upstanding ridge 6 adjacent to the inlet port or displaced radially from it, the axial end face of the rubber seal does not protrude from the plunger shroud, but is rather retracted from it by a small amount so as to form a recess between the centre portion 31 of the plunger nose and the plunger shroud 32. Sealing takes place when the projecting seat ridge 6 enters the mouth of the seal recess in the plunger and makes contact with the rubber seal 5. The depth of penetration of the seal ridge 6 into the rubber seal 5 is determined by the amount by which the height the seat ridge 6 exceeds the depth by which the effective part of the seal is retracted in the mouth of its housing recess in the plunger nose. Once this penetration has taken place metal-to-metal contact is achieved between the flat annular surface 33 on the plunger and the flat annular surface 7 of the valve seat surrounding the upstanding rim, and any further penetration or distortion of the valve seal is prevented.

The advantage of this construction in certain cases is that the rubber seal 5 is removed from the zone of high velocity fluid flow, when the valve plunger 3 is just lifted off this seat 4. It is this high velocity fluid jet which tends to abrade and damage rubber seals, but by being withdrawn from the high velocity flow region, the rubber seal is effectively protected. Also the depth of the seal recess in the plunger and the design of the operating parts of the seat and plunger, can serve to determine the precise operating characteristics of the safety valve.

The fitting of the plunger shroud 32 to the plunger centre piece may also be by their being screwed together and in certain cases this provides the correct support for the plunger shroud 32 on the centre portion 31 of the plunger, while allowing an adequate radial clearance around the seal 5 to prevent it being puckered or distorted during assembly of the plunger unit.

In a safety valve plunger and seal assembly, the sealing ring is easily and safely fitted into position and the assembly of the plunger is simple, robust and reliable. The outer surface of the components of the plunger can readily be shaped in any convenient or required form to achieve the required safety valve performance, and without being trammelled by the presence or the method of securing the sealing ring. The sealing ring is robust and safely mounted, yet its sealing rim portion can be formed with precision to provide a precisely determined sealing diameter when the valve is closed. Finally, the nature and form of both the metal components of the assembly, as well as the sealing ring, are such as to provide for economic and reliable manufacture.

A second embodiment of valve closure assembly is shown in FIG. 3.

Referring to FIG. 3, the valve again includes an entry port 1 surrounded by a valve seat, generally designated 4. The seat 4 has, immediately adjacent and surrounding the port 1, an upstanding annular ridge 6 and, immediately surrounding said ridge, a flat annular seating surface 7. The valve closure assembly also includes a plunger, generally designated 3. The plunger again has a nose which is constituted in part by a flat annular metal portion adapted to be brought into metal-to-metal contact with the flat annular seating surface 7 on the valve seat 4.

On the nose of the plunger 3, immediately within said flat annular metal portion 33, there is formed an annular mouth 41 leading to a recess, generally designated 40, having an overhang at 42. A ring, generally designated 50, of elastomeric material, is housed in the recess 40 and is trapped behind the overhang 42 thereof.

In this embodiment, the ring 50 has a main body portion which is of generally D-shape and from this main body portion there projects an extension 51 which occupies the mouth 41 of the recess 40.

When the flat annular portion 33 of the plunger nose is in metal-to-metal contact with the flat annular seating surface 7 of the valve seat 4, the raised ridge 6 of the valve seat enters into the mouth 41 of the recess 40 and is pressed into resiliently deforming contact with the extension part 51 of the elastomeric sealing ring 50, which part 51 occupies the mouth 41 of the recess 40.

Thus the raised ridge 6 bites into the rubber seal with the depth of penetration being limited by the metal-to-metal abutment of the plunger nose on the seat face.

The embodiments of the invention depicted in FIGS. 1 to 3 have a number of important advantages. In particular the "trapped" configuration of the ring 5 greatly limits any tendency which it may have to deform permanently as a result of penetration by the raised rim 6 of the seat.

The elastomeric material is prevented or denied the possibility of "flowing out" from its cavity or recess in any significant way. This ensures that the point of sealing contact on the elastomeric seal remains substantially constant. This constancy of the sealing point is of great importance in safety valves because upon this feature depends the constancy of the seat pressure on which the safety valve begins to lift and the inlet port ceases to be obturated.

A further advantage lies in relation to the fact that all elastomeric compounds, in particular those utilizing rubber, tend to show shrinkage during moulding. This shrinkage varies significantly between different types of elastomeric compound and also there is a degree of random variability in components made from given compounds in large-scale quantity production. In disc type seals this variable shrinkage is often a nuisance as it effects the tightness of the fit of the seal in its housing recess. The trapped configuration of the sealing ring provided according to the present invention in its overhung recess, avoids this difficulty.

Indeed, according to a preferred feature of the invention the elastomeric seal is so made that its cross-section is slightly larger than the cross-section of the recess in which it is adapted to fit, so that the elastomeric body is under a small degree of precompression when fitted in its recess.

A further advantage of the particular embodiments as shown in the FIGS. 1 to 3 is that the two-part metal construction of the plunger 3 means that there is a joint between the two parts. This simple metal-to-metal joint can conveniently constitute a leakage path by way of which any fluid which enters behind the ring 5 or 15 in its recess 40 can escape.

A final advantage of the embodiments illustrated lies in the fact that accurate machining is only needed in application to the seat and the recess ring 6 thereof.

I claim:

1. A valve of the kind which includes a plunger guided for movement toward and away from a coaxial annular plunger seat surrounding an inlet port of the valve, comprising:

a flat annular metal seating surface on the plunger seat;

a nose on the plunger having a flat annular metal portion thereon positioned to lie in metal-to-metal contact with said metal seating surface when the valve is closed to obturate fluid flow through the inlet port of the valve;

a housing recess defined in said flat annular metal portion, said recess having an open mouth portion; said flat annular metal portion having an overhang in said housing recess adjacent said open mouth portion;

an annular L-shaped elastomeric sealing element housed in said housing recess, and having a square body portion trapped in said housing recess behind said overhang and a further rectangular portion extending into said open mouth portion of said housing recess and a flat annular sealing region on a terminal end of said further portion, said flat annular sealing portion of said elastomeric sealing element being immediately within but set back from said annular metal surface of said plunger nose to define a set-off portion of said recess, said elastomeric element square body portion essentially completely filling said housing recess behind said overhang, said rectangular protruding portion having a width approximately one-half the width of said square body portion;

an upstanding annular ridge on said plunger seat flat annular metal seating surface, said ridge being positioned to be immediately adjacent and to surround the inlet port of the valve and to be immediately surrounded by said plunger seat flat annular metal seating surface, said ridge having a height above said metal seating surface sufficient so that said ridge extends into said recess open mouth and into deforming contact with said elastomeric member flat annular sealing region when said plunger nose flat annular metal portion is in metal-to-metal contact with said plunger seat flat annular seating surface.

2. A valve according to claim 1 wherein said plunger nose includes a central part and a metal ring surrounding said central part, said plunger flat annular metal portion being on said metal ring, said housing recess being defined by said central part and said metal ring, and a leakage path defining region defined by said central part and said metal ring, said leakage path leading from said housing recess to atmosphere.

3. A valve according to claim 1 wherein said rectangular protruding portion width is approximately one-half the width of said square body portion.

4. A valve according to claim 1 wherein said sealing element protruding portion is concave, said concavity being positioned to accommodate said annular ridge.

* * * * *